L. DURGARIAN.
BROILER.
APPLICATION FILED APR. 30, 1919.

1,324,544.

Patented Dec. 9, 1919.
2 SHEETS—SHEET 1.

INVENTOR
Leo Durgarian
By Strong & Townsend
ATTORNEYS

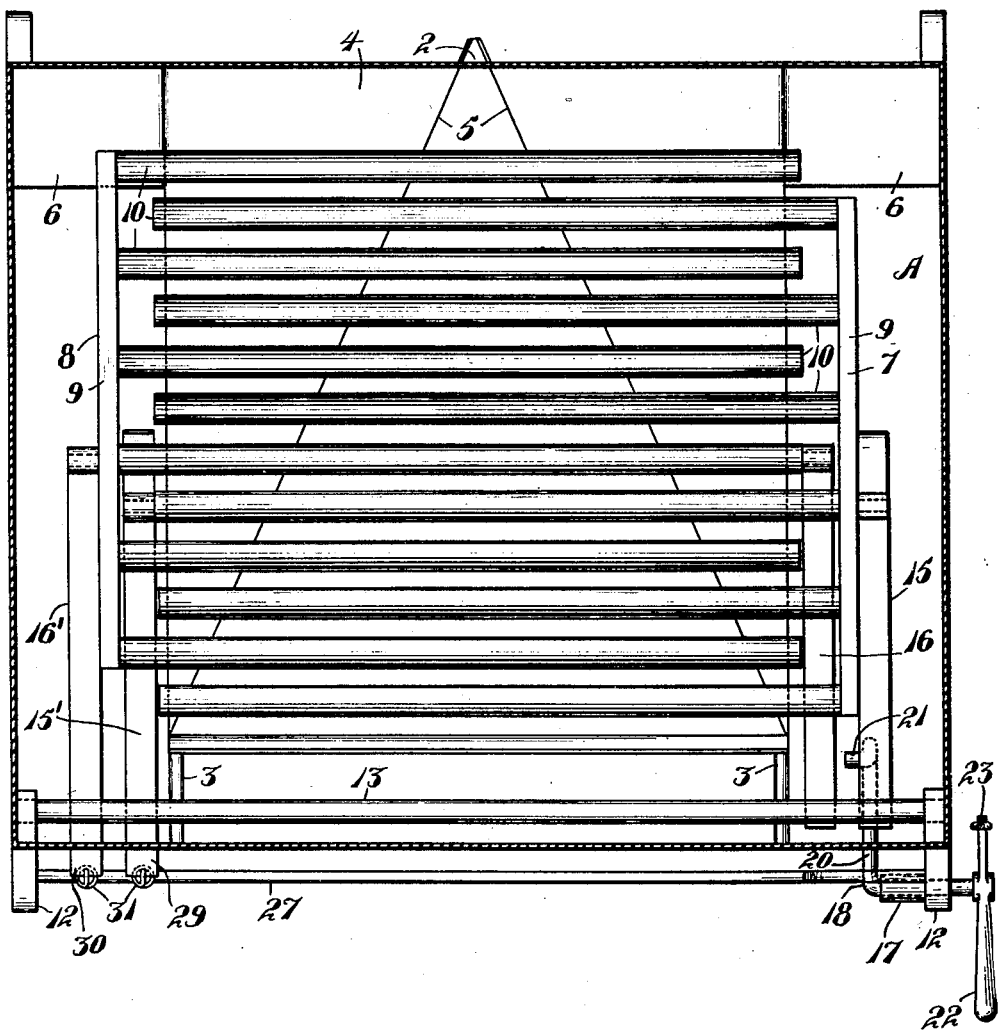

UNITED STATES PATENT OFFICE.

LEO DURGARIAN, OF FRESNO, CALIFORNIA.

BROILER.

1,324,544.   Specification of Letters Patent.   Patented Dec. 9, 1919.

Application filed April 30, 1919. Serial No. 293,619.

*To all whom it may concern:*

Be it known that I, LEO DURGARIAN, a citizen of the United States, residing at Fresno, in the county of Fresno and State of California, have invented new and useful Improvements in Broilers, of which the following is a specification.

This invention relates to an implement designed especially for cooking and broiling meats and which may be also used for toasting or other like cooking purposes.

An object of the invention is to provide a cooking or broiling implement having operative means whereby a grid may be quickly raised above another suitably for the insertion of food between them.

Another object of the invention is to provide a cooking or broiling implement having operative means whereby the grids employed may be alternately applied to the top and bottom surfaces and thereby supply a substantially uniform heat to each side of the food being cooked or broiled.

Still another object of the invention is to provide such a cooking or broiling implement which will permit the food to be quickly inserted into the cooking chamber and between the grids or quickly taken out of the cooking chamber for turning as the case may require.

Also another object of the invention is to provide a cooking or broiling implement which is highly efficient in utilization of the heat applied.

And also a further object of the invention is to provide a cooking or broiling implement, as above characterized, which is simple in construction and inexpensive to manufacture.

With the above and other objects in view, the invention consists in the novel features of construction, combination and arrangement of parts to be hereinafter more fully described, claimed and illustrated in the accompanying drawings:—

Fig. 3 is a top plan view with the cover removed.

Figure 1:
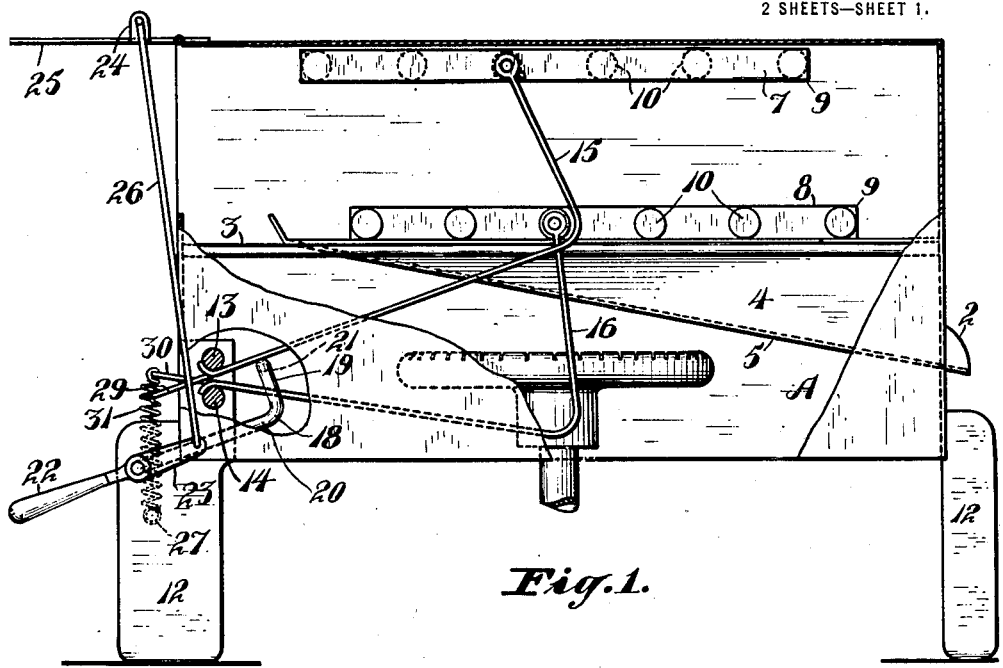
Figure 1 is a side elevation partly broken away.
Figure 2:
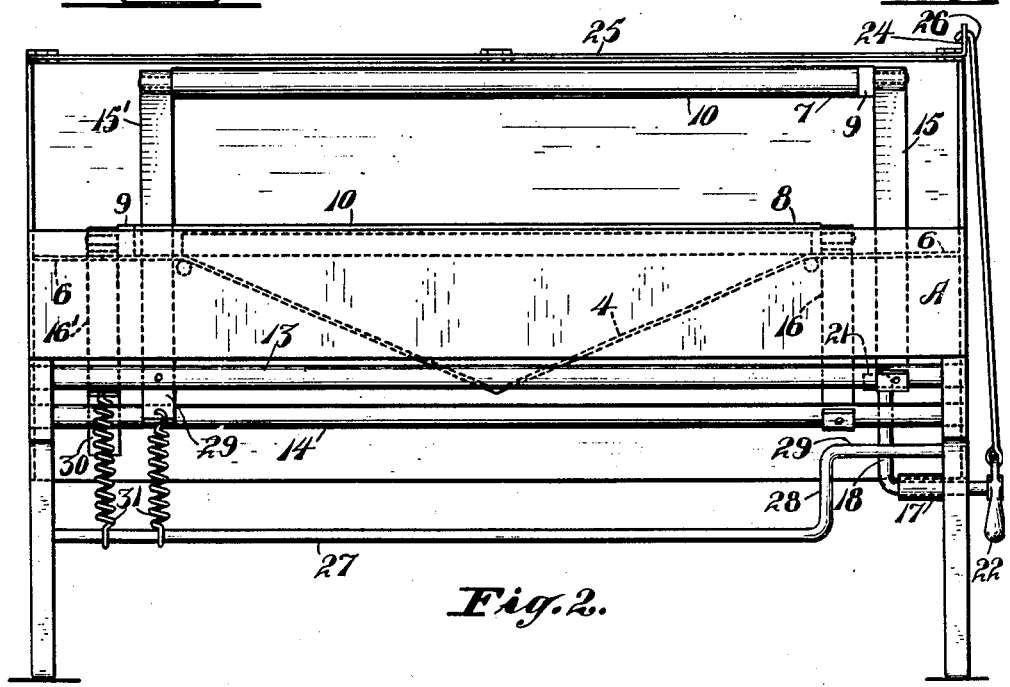
Fig. 2 is a front elevation.

Referring to the drawings in detail, a box-like structure A, preferably of light sheet metal is provided and having in its rear wall an opening 2. Rods 3 are secured between the front and rear walls and adapted to support a pan 4. The rods 3 are slightly disposed on an incline for the purpose of sloping the pan toward the rear walls of the structure. The pan 4 has its edge adjacent to the front wall turned up and is further creased or bent downwardly upon the diagonal lines 5, thus forming a drain for meat juices, or the like, which may be collected on the pan. Extensions 6 are provided on the pan to brace the same against horizontal movement. Above the pan 4 and adapted to rest thereon are grids 7 and 8, each comprising a base strip 9 with a plurality of spaced fingers 10 extending at right angles therefrom, the fingers of one grid being adapted to lie within the fingers of the other when resting on the pan 4. Suitable legs, or supports, 12 are provided and between the forward or front legs there is suitably mounted for turning movement the rods 13 and 14, a pair of horizontally disposed arms 15 and 15' extend inwardly from the rod 13 and near their ends are bent upwardly at approximately right angles to their horizontal portion. A second pair of arms 16 and 16', similar to the rods 15 and 15' extend from the rod 14, and differ only from the arms 15 and 15' in that their horizontal portions are slightly longer than the same portions of the arms 15 and 15'. Between the terminals of the arms 15 and 15' the grid 7 is pivotally connected and between the terminals of the arms 16 the grid 8 is likewise connected—one terminal being pivotally connected to the base strip 9 and the other to the finger 10 in each instance.

A support 17 is secured to a forward leg 12 of the structure A, and one end of an arm 18 is journaled therein. The arm 18 is irregular in shape and, when in its normal or non-operative position, comprises the vertical portion 19 and the horizontal portions 20 and 21, the last-named portions forming substantially an L.

A lever arm 22 is secured to the journaled end of the arm 18, said end extending outwardly a short distance from the support 17. The shorter arm 23 of the lever arm 18 is connected by a link 26 to an outwardly extending lug 24 secured to a shutter 25.

Between the forward legs or supports 12 there is rigidly secured the rod 27. This rod is bent upwardly as at 28 and then inwardly as at 29, the purpose of which will later be made apparent. The arm 15' pivotally connected to the grid 7 and extending from the rod 13 projects outwardly from the rod 13, as indicated at 29, and the arm 16 pivotally connected to the grid 8, and extending from the rod 14 has a similar projection, as indicated at 30. To each projection 29 and 30, one end of a spiral spring 31 is secured, the other end of the springs being secured to the rod 27.

When it is desired to cook, broil or toast, such as meat, bread or otherwise, the food is placed in a broiler or toaster of ordinary type, such as two hinged gratings, or the like, (not shown). The lever arm 22 is pressed downwardly which raises the shutter 25. This action of the lever arm also raises the arm 18, so that its portion 21 engages beneath the arm 16 to which one side of the grid 8 is pivoted and raises the grid 8 to a sufficient height above the grid 7 to permit the broiler containing the food to be slid between the two grids. The spring 31 connected to the arm 16 aids in lifting the grid. Now, by raising the lever arm 22, the shutter 25 is closed and the grid 8 is lowered to a resting position on the upper surface of the broiler or meat being broiled or cooked. If it is desired to alternate the grids, the projecting portion of the journaled end of the arm 18 is shoved inwardly by the operator exerting pressure on the lever arm 22 which brings the end portion 21 of the lever arm beneath the arm 15', and now by lowering the lever arm 22, the shutter 25 is raised to its open position and the grid 7 is raised above the grid 8, the spring 30 connected to the arm 15' aiding in raising the grid. The grids are usually alternated when the food is withdrawn to turn and subject what has been the upper surface of the food to a more intense heat.

The operations above described may be repeated as many times as desired during the course of cooking or broiling whereby an approximate even temperature may be applied to both sides of the food, and the same thereby efficiently broiled or toasted.

It is also to be pointed out that the shape of the heating pan and opening in rear wall of structure permits the heat from a gas flame, or the like, applied beneath the pan (not shown) to freely circulate over the grid and food and thereby utilizing the heat applied in an efficient manner.

Having thus described my invention, what I claim and desire to secure by Letters Patent is:

1. In a cooking or broiling device of the class described, a box structure, a heating pan disposed within the walls of the said structure under which heat may be applied, a pair of grids supported above the pan and operating means connected to said grids whereby one grid may be disposed above the other suitably for inserting a broiler between said grids, or vice versa.

2. In a cooking or broiling device of the class described, a box structure provided with an opening adapted to admit the food to be cooked or broiled, a hinged shutter over said opening, a heating pan disposed within the walls of the said structure under which heat may be applied, a pair of grids supported above the pan and operating means connected to said grids and shutter whereby one grid may be raised above the other sufficiently to introduce the food between said grids and simultaneously raising the shutter for introducing the food into the cooking chamber.

3. A cooking device of the class described, including a box structure, a heating pan disposed between the walls of said structure, a pair of grids above said pan, each grid comprising a strip and a plurality of fingers extending at right angles therefrom, the fingers being adapted to lie within each other and operating means connected to said grids whereby one grid may be raised above the other or vice versa.

4. A cooking device of the class described, a box structure provided with an opening in its side wall adapted for the introduction of food, a hinged shutter over said opening, a heating pan disposed within the walls of said structure, a pair of grids supported above said pan, and manual operating means connected to said grids and said shutter whereby simultaneously either of the grids may be raised above the other and the shutter lifted for the introduction of food.

5. In a cooking device of the class described, including a cooking chamber, a pair of grids in said chamber, two rotatable rods, a pair of arms extending from each rod, each pair of arms being adapted to hold a grid for pivotal movement, and operative means whereby either pair of arms may be raised for disposing one of the grids above the other.

6. In a cooking device having a cooking chamber, a pair of grids within said chamber, said grids being adapted to rest in the same plane when in non-operative position, and means whereby one grid may be disposed above the other or vice versa suitable for the insertion of food therebetween.

In testimony whereof I have hereunto set my hand in the presence of two subscribing witnesses.

LEO DURGARIAN.

Witnesses:
M. G. ALEXANIAN,
R. PERRY.